(12) United States Patent
Li et al.

(10) Patent No.: US 9,278,519 B2
(45) Date of Patent: Mar. 8, 2016

(54) CONTROL SYSTEM AND METHOD FOR USE IN DIGITAL PRINTING

(71) Applicants: Peking University Founder Group Co., Ltd., Beijing (CN); Peking University, Beijing (CN); Beijing Founder Electronics Co., Ltd., Beijing (CN); Peking University Founder R&D Center, Beijing (CN)

(72) Inventors: Dan Li, Beijing (CN); Shaowei Guo, Beijing (CN); Xiaohui Wen, Beijing (CN); Zhihong Liu, Beijing (CN)

(73) Assignees: Peking University Founder Group Co., Ltd., Beijing (CN); Peking University, Beijing (CN); Beijing Founder Electronics Co., Ltd., Beijing (CN); Peking University Founder R&D Center, Beijing (CN)

( * ) Notice: Subject to any disclaimer, the term of this patent is extended or adjusted under 35 U.S.C. 154(b) by 0 days.

(21) Appl. No.: 14/130,625

(22) PCT Filed: Sep. 26, 2012

(86) PCT No.: PCT/CN2012/082062
§ 371 (c)(1),
(2) Date: Jan. 2, 2014

(87) PCT Pub. No.: WO2013/044805
PCT Pub. Date: Apr. 4, 2013

(65) Prior Publication Data
US 2014/0152728 A1    Jun. 5, 2014

(30) Foreign Application Priority Data

Sep. 30, 2011    (CN) .......................... 2011 1 0299801

(51) Int. Cl.
*B41J 2/045*    (2006.01)
*G06K 15/02*    (2006.01)
(Continued)

(52) U.S. Cl.
CPC ............. *B41J 2/04543* (2013.01); *G06F 3/124* (2013.01); *G06F 3/1214* (2013.01); *G06F 3/1281* (2013.01); *G06K 15/00* (2013.01); *G06K 15/1814* (2013.01); *G06K 15/1857* (2013.01)

(58) Field of Classification Search
CPC . B41J 2/04501; B41J 2/04543; B41J 2/04545
USPC ........................................................ 347/5, 13
See application file for complete search history.

(56) References Cited

U.S. PATENT DOCUMENTS 6,084,621 A * 7/2000 Shioya .......................... 347/101
6,438,631 B1    8/2002 Kawase
(Continued)

FOREIGN PATENT DOCUMENTS

CN            1264863 A        8/2000
CN        101117059 A        2/2008
(Continued)

*Primary Examiner* — Geoffrey Mruk
*Assistant Examiner* — Scott A Richmond
(74) *Attorney, Agent, or Firm* — The Webb Law Firm

(57) ABSTRACT

The present invention provides a control system for use in digital printing, comprising: a host; multiple main control boards connected to the host, multiple sets of nozzle plates, wherein each set of nozzle plate respectively is connected to one main control board and to one set of nozzle. The present invention also provides a control method for use in digital printing, comprising: the host decomposing a job into multiple portions, and distributing each portion of the job to one main control board; the main control boards concurrently converting received portions of the job into pages and distributing the pages to a set of nozzle plates connected thereto; the nozzle plates converting the pages into printing data and driving the nozzle sets connected to the nozzle boards to print the printing data thereof. The present invention achieves the effect of improving processing performance of the control system.

5 Claims, 3 Drawing Sheets

(51) Int. Cl.
*G06F 3/12* (2006.01)
*G06K 15/00* (2006.01)

(56) References Cited

U.S. PATENT DOCUMENTS

| 7,202,967 | B2 | 4/2007 | Fujimaki | |
| 2005/0140714 | A1* | 6/2005 | Silverbrook et al. | 347/19 |
| 2006/0055953 | A1* | 3/2006 | Ishii et al. | 358/1.13 |
| 2007/0109568 | A1* | 5/2007 | Keithley et al. | 358/1.9 |
| 2008/0158577 | A1 | 7/2008 | Yamaguchi et al. | |
| 2009/0021766 | A1* | 1/2009 | Yamazaki | 358/1.14 |
| 2010/0134808 | A1* | 6/2010 | Hopper et al. | 358/1.8 |
| 2011/0175962 | A1 | 7/2011 | Miura et al. | |

FOREIGN PATENT DOCUMENTS

| CN | 101407135 A | 4/2009 |
| CN | 102189764 A | 9/2011 |
| JP | H08297436 A | 11/1996 |
| JP | 09039241 A | 2/1997 |
| JP | 2003246123 A | 9/2003 |
| JP | 20020240263 A | 2/2009 |
| JP | 20090034903 A | 2/2009 |
| JP | 2010211706 A | 9/2010 |

* cited by examiner

CONTROL SYSTEM AND METHOD FOR USE IN DIGITAL PRINTING

CROSS-REFERENCE TO RELATED APPLICATIONS

This application is the United States national phase of International Application No. PCT/CN2012/082062 filed Sep. 26, 2012, and claims priority to Chinese Patent Application No. 201110299801.9 filed Sep. 30, 2011, the disclosures of which are hereby incorporated in their entirety by reference.

TECHNICAL FIELD

The present invention relates to the field of printing, and more particularly, to a control system and a control method used in digital printing.

BACKGROUND

In a digital printing equipment, a control system, as a master control centre of the entire equipment, plays a decisive role in determining whether every step of each actuator of the entire equipment operates properly. A complete equipment generally has a sound flow of control, and the control system takes the responsibility for fully manipulating and maintaining the entire flow of control. Currently, designs of control systems employed in the industry are mostly centralized control system architecture. FIG. 1 is an architecture diagram illustrating a centralized control system from the prior art, which includes three parts according to the data flow. The first part is a host 10 responsible for performing functions such as initial configuration of the system, parameter setting, and initiation of a print job and the like. The second part is a main control board used to convert a received job into a page, and distribute the page to nozzle plates 30. The second part can further be responsible for functions such as receiving and configuring parameters sent from the host, receiving data, managing data, sending data and the like. The third part is a set of nozzle plates 30, which is responsible for receiving data and interfacing with inkjet devices, and used to convert the page into printing data suitable for nozzles to print, and drive the nozzle sets (not shown) connected thereto to print the printing data thereof. For different types of nozzles, the same type of main control board can be used, but nozzle plates are different.

It can be seen from FIG. 1 that a centralized control system is simple and easy to implement, and has significant advantages in performing system verifications and designing small-size systems, and thus is used widely. However, as the demand for printing is continuously increasing, a system needs to be expanded, for example, to be upgraded from monochrome printing to color printing, or to be expanded from narrow-format printing to wide-format printing. As a result, the number of the nozzle plates N will be multiplied, which causes the main control board to control more nozzle plates, and the needed resources and interfaces to be multiplied. In this case, the centralized control system faces problems such as system bandwidth bottleneck, interface bottleneck, failure of synchronous collaboration among modules and the like. Then it is necessary to redesign the main control board to meet the needs, and when the number of nozzle plates to be controlled reaches a certain amount, the resources required for a system will rapidly expand on one system board, thus the complexity of the design will increase greatly, which is unfavorable for system development and the subsequent debugging and operation.

SUMMARY OF THE INVENTION

The present invention intends to provide a distributed control system and a method, so as to solve the bottleneck problems in centralized control systems of the prior art.

Embodiments of the present invention provide a control system for use in digital printing, comprising:
a host;
a plurality of main control boards connected to the host;
a plurality of sets of nozzle plates, each set of which is connected to one of the main control boards and a set of nozzles, respectively.

Preferably, the host comprises a plurality of interfaces, each of which is connected to one of the main control boards, and the host and the main control boards are connected via Ethernet.

Preferably, the host comprises a plurality of pairs of interfaces, each pair of which is connected to one of the main control boards, and comprises an optical fiber interface used for transmitting control signals and an Ethernet interface used for transmitting data signals.

Preferably, the plurality of main control boards are connected with each other for example via Ethernet.

Preferably, one of the plurality of main control boards is a primary main control board, and the rest of the plurality of main control boards are secondary main control boards which are controlled by the primary main control board.

Embodiments of the present invention provide a control method for use in digital printing, comprising:
a host decomposing a job into a plurality of portions and distributing each portion of the job to one of main control boards;
each of the main control boards concurrently converting the received portion of the job into pages and distributing the pages to a set of nozzle plates connected thereto;
the nozzle plates converting the pages into printing data and driving a set of nozzles connected thereto to print the printing data.

Preferably, the host decomposes the job into a plurality of portions according to ink colours.

Further preferably, the ink colours include four types of ink colours;
The host decomposes the job into two portions, each of which includes the job for two ink colours;
Or the host decomposes the job into four portions, each of which includes the job for one ink colour.

Preferably, one of the plurality of main control boards is a primary main control board, and the rest of the plurality of main control boards are secondary main control boards which are controlled by the primary main control board to keep synchronized with the primary main control board.

Further preferably, the step of each of the main control boards concurrently converting the received portion of the job into pages and distributing the pages to a set of nozzle plates connected thereto comprises:
the primary main control board and the secondary main control boards concurrently converting the respective received portions of the job into the pages;
the secondary main control boards sending requests to the primary main control board for distributing the page to the set of nozzle plates connected thereto;
the primary main control board determining that all of the main control boards have converted the respective received portions of the job into the pages;

the primary main control board sending a activating signal to all of the main control boards;

the primary main control board and the secondary main control boards concurrently distributing the respective pages to the sets of nozzle plates connected thereto;

each secondary main control boards receiving a signal indicating successful printing from all of the nozzle plates connected thereto;

each secondary main control boards notifying the primary main control board that the printing is successful;

the primary main control board determining that all of the main control boards have printed successfully;

the primary main control board sending a waiting signal to all of the main control boards; and the primary main control board and the secondary main control boards concurrently waiting for the respective portions of the job distributed from the host.

Since the control system and method for use in digital printing according to the above embodiments achieve distributed control by using a plurality of main control boards, the bottleneck problems of the centralized control systems are overcome, and the processing performance of the control systems are improved.

BRIEF DESCRIPTION OF THE DRAWINGS

The figures illustrated herein are provided for further understanding of the present invention, in which.

Wherein, the reference numbers are as follows: 10, host; 20, main control board; 22, primary main control board; 24, secondary main control board; 30, nozzle plate; 32, nozzle plate; 34, nozzle plate; 36, nozzle plate; 38, nozzle plate.

DETAILED DESCRIPTION

In order to facilitate better understanding of the technical solutions in the present invention by the person skilled in the art, the present invention will be described in detail in conjunction with embodiments with reference to the accompanying drawings.

First Embodiment

Figure 1:
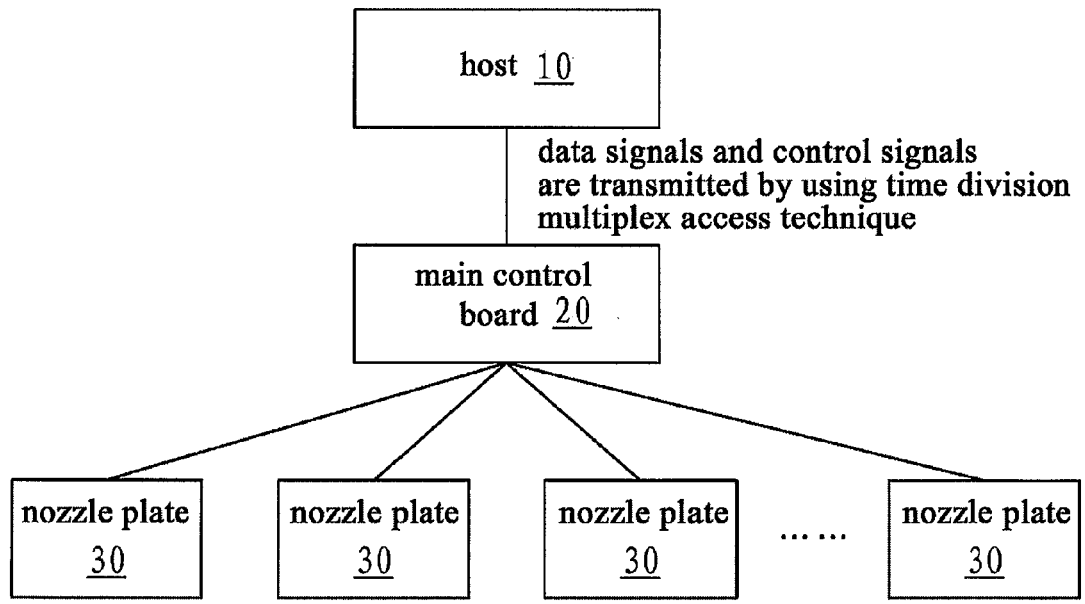
FIG. 1 is a diagram illustrating a configuration of a centralized control system from the prior art.
Figure 2:
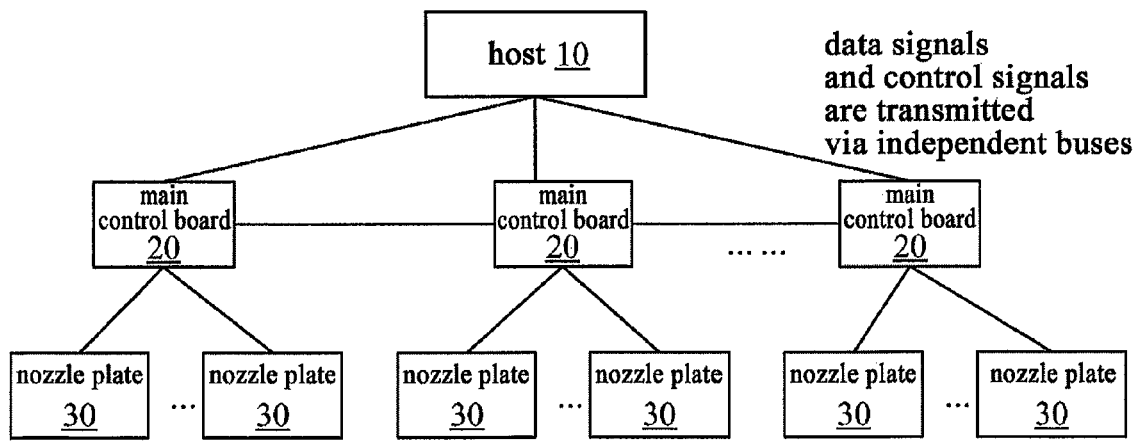
FIG. 2 is a diagram illustrating a configuration of a control system according to a first embodiment of the present invention.

FIG. 2 is a diagram illustrating the configuration of a control system according to the first embodiment of the present invention, and the system comprises:

a host 10;

a plurality of main control boards 20 connected to the host 10, which form a main control board unit;

a plurality of sets of nozzle plates 30, each set of which is connected to one main control board 20 and a set of nozzles (not shown), respectively, and each set of nozzle plates 30 may include one and more nozzle plates.

Second Embodiment

Figure 3:
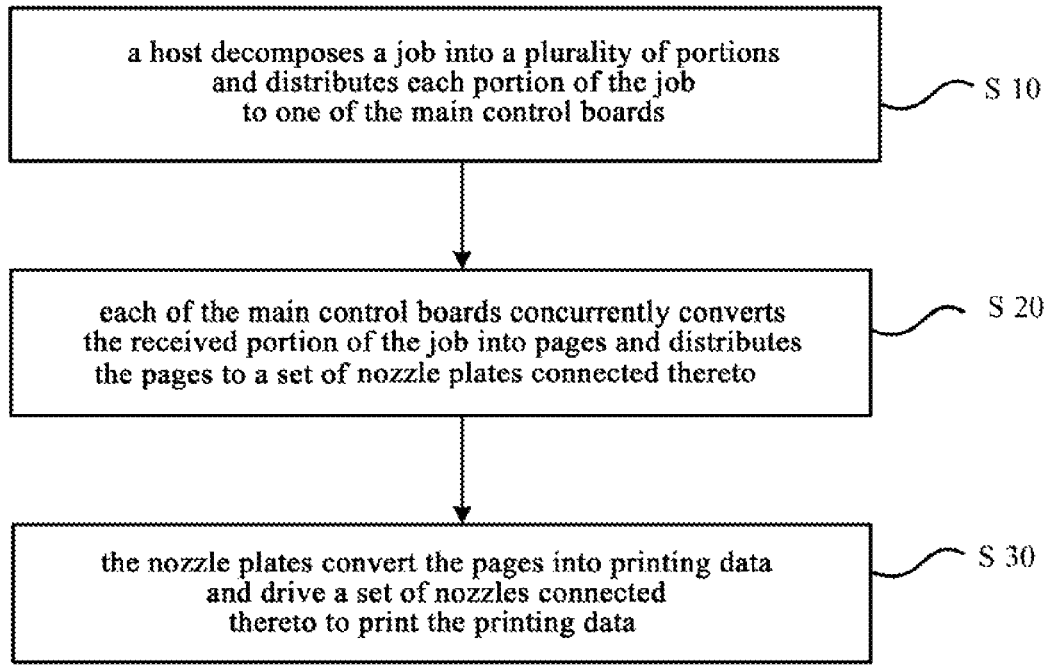
FIG. 3 is a flow chart illustrating a control method according to a second embodiment of the present invention.

FIG. 3 is a flow chart illustrating a control method according to the second embodiment of the present invention, and the method comprises:

step S10, a host decomposes a job into a plurality of portions and distributes each portion of the job to one main control board, and the host may further have functions such as initializing configuration of the system, parameter setting, initiation of a print job, status enquiry and displaying and the like;

step S20, each of the main control boards concurrently converts the received portion of the job into pages and distributes the pages to a set of nozzle plates connected thereto; and step S30, the nozzle plates convert the pages into printing data and drive a set of nozzles connected thereto to print the printing data.

Inventors have conducted an in-depth study of the centralized control systems in the prior art and found that the host of a centralized control system possesses the strongest computing capacity, and the main control board comes second, further followed by the nozzle plate. In the aspect of task processing, in a centralized control system, one host corresponds to one main control board and one main control board corresponds to a plurality of nozzle plates. Thus in view of computing capacity matching, it can be found that a bottleneck constraining the processing performance of the centralized control system is the main control board. Such bottleneck in the main control board of the centralized control system in the prior art brings problems such as being unfavourable for system expansion, having bottleneck in data bandwidth and increasing difficulty in design with increasing size of system, and the like.

The control system according to the present embodiment adopts a plurality of main control boards, which form a distributed control system architecture. Since the computing capacity of the host is much stronger than that of the main control board, the number of main control boards controlled by the host can be set freely. As such, the entire system has a stronger extensibility. When requirement for printing is relatively low, one main control board is sufficient. When the requirements for printing increases, for example, when low-speed printing is changed into high-speed printing, when monochrome printing is upgraded into color printing, or when narrow-format printing is expanded into wide-format printing, a plurality of main control boards can be used. Basic functions, such as parameter passing, data reception, data management, data transmission and the like, of each of the main control boards keep consistent with the centralized system, and meanwhile, the process of synchronizing jobs needs to be performed among the main control boards. This distributed control system, which is easily realized, has strong extensibility and high bandwidth, and effectively solves the problems existing in the traditional centralized systems.

Preferably, the host comprises a plurality of interfaces, each of which is connected to one main control board. In this preferred embodiment, by extending the interface sections of the host and its downstream devices by using multiple interfaces, the host can hook a plurality of main control boards so as to facilitate system expansion.

Preferably, the host comprises a plurality of pairs of interfaces, each pair of which is connected to one main control board, and each pair of interfaces comprises an optical fiber interface used for transmitting control signals and an Ethernet interface used for transmitting data signals.

In centralized control systems, data signals and control signals are transmitted between a host and a main control board via a same Camera Link cable, thus it is necessary to use a time division multiplex access technique, and the transmission speed is limited. In contrast, in this preferred embodiment, the host and the main control board are connected via both Ethernet and optical fiber, wherein control signals are transmitted via Ethernet and data signals via optical fiber, so that data signals and control signals are transmitted independently. As the current Internet development technology has been very mature, the system is simply implemented, and transmitting data via optical fiber significantly improves data transmission speed.

Preferably, the plurality of main control boards are connected with each other. Different from centralized systems, if a plurality of main control boards are used, it is necessary to synchronize jobs among the main control boards, and this can be done by connecting the main control boards with each other. In addition to connecting the main control boards with each other, the plurality of main control boards may also be synchronized by the host, which falls into the scope of the present invention.

Preferably, the plurality of main control boards are connected with each other via Ethernet. As such, the host and the main control boards form a small-size network, data are transmitted through TCP/IP protocol, and jobs may be synchronized via network among the main control boards.

Preferably, the plurality of main control boards comprises a primary main control board, and the rest of the plurality of main control boards are secondary main control boards which are controlled to be synchronous with the primary main control board by the primary main control board. If a plurality of main control boards are used, it is necessary to synchronize jobs among main control boards. and in the preferred embodiment, the synchronization among the main control boards is achieved by establishing a primary and secondary relationship among the plurality of main control boards.

Preferably, the host decomposes the job into a plurality of portions according to the ink colours. The ink colours form the colour space of inkjet printing. When the job is decomposed according to the ink colours, decomposition process can be easily achieved, and the computational load of each main control board is basically the same, which improves the degree of parallelism in the distributed controlling, thereby improving printing efficiency.

Further preferably, the ink colours includes four types of ink colours; the host decomposes the job into two portions, each of which includes the job of two ink colours; or the host decomposes the job into four portions, each of which includes the job of one ink colour. For example, CMYK (i.e. four primary colours of Cyan, Magenta, Yellow and Black) is the most common printing colour space, and therefore this preferred embodiment can be used in a wide range of application.

Third Embodiment

Figure 4:
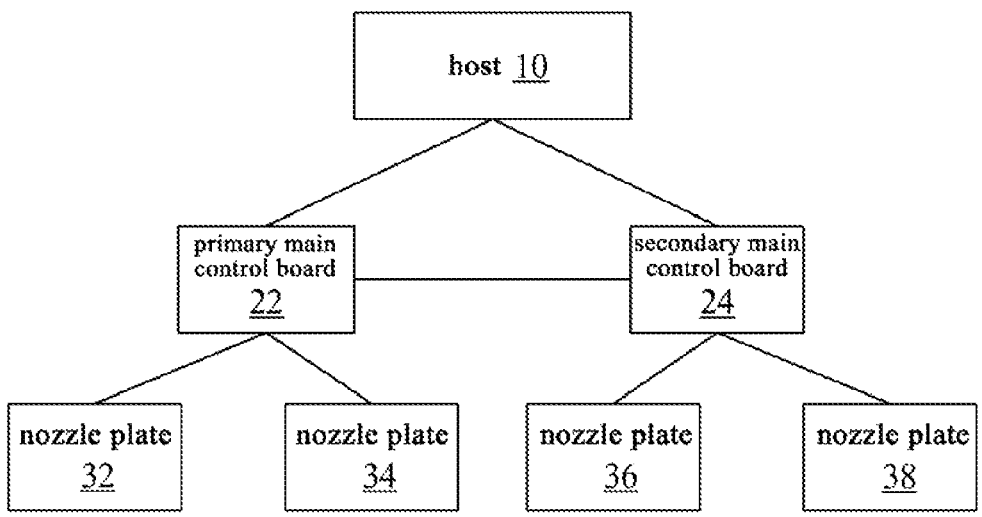
FIG. 4 is a diagram illustrating a configuration of a control system according to a third embodiment of the present invention.

FIG. 4 is a diagram illustrating the configuration of a control system according to the third embodiment of the present invention. According to the requirements of the inkjet apparatus, in this embodiment, one main control board 22/24 may be used to control two-colour printing data. Meanwhile, according to the requirements of print width, two nozzle plates 32, 34/36, 38 need to be connected to each main control board 22/24. Therefore, the requirements of four-color printing, specified print width and printing with a selected nozzle may be simply satisfied by the configuration of "two main control boards 22, 24 plus four nozzle plates 32, 34, 36, 38".

It should be noted that, since two main control boards are used and each of them controls images of two colors from the four colors, a printing job needs to be synchronized between the two main control boards 22, 24. Therefore, by using Ethernet, the main control board 22 functions as the primary main control board (i.e., server) and the main control board 24 functions as the secondary main control board (i.e., client), so as to form a network path.

Fourth Embodiment

Figure 5:
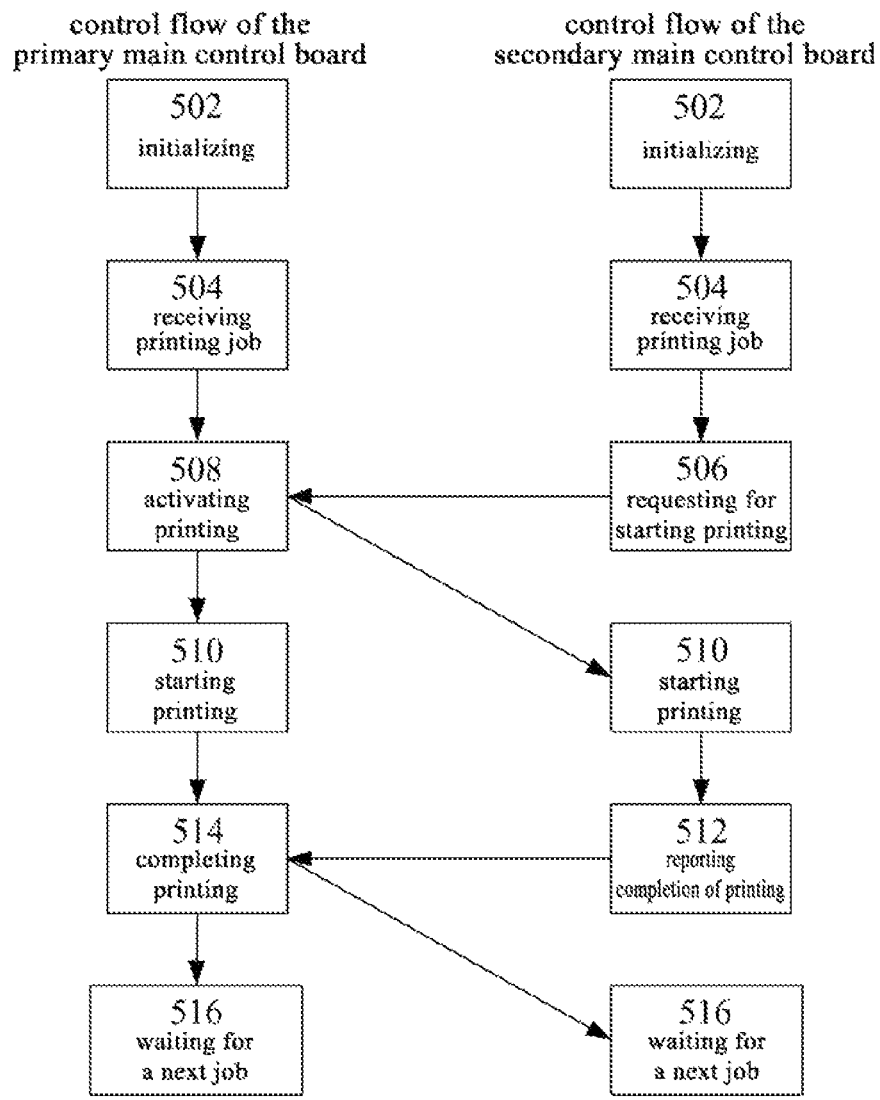
FIG. 5 is a flow chart illustrating a control method according to a fourth embodiment of the present invention.

FIG. 5 is a flow chart illustrating a control method according to the fourth embodiment of the present invention, the method comprising the steps as below.

step 502, the two main control boards start to be initialized after being powered on, after that the host starts transmitting printing data and each main control board controls two-colour data, respectively.

step 504, the primary main control board and the secondary main control board concurrently start to receive two-colour printing jobs, respectively.

step 506, the primary main control board and the secondary main control board concurrently convert the respective received portions of the jobs into pages and distribute the pages to the sets of nozzle plates connected thereto, and when the secondary main control board determines that a certain number of pages have been transmitted to the nozzle plates connected thereto, the secondary main control board sends a request to the primary main control board for starting printing.

step 508, when the primary control board has transmitted a certain number of pages to the set of nozzle plates connected thereto, and confirms that all signals of requesting for starting printing have been received from the secondary main control board, i.e. all of the nozzle plates have data ready to be printed, the primary main control board sends a printing start signal to all of the main control boards.

step 510, the primary main control board and the secondary main control board send a printing signal for each page to the sets of nozzle plates connected thereto, respectively, and start printing.

step 512, after the respective main control boards receive a signal indicating successful printing (i.e. all the pages have been printed) from all of the nozzle plates connected thereto, the secondary main control boards notifies the primary main control board that the printing is successful.

step 514, after determining that all of the main control boards have successfully printed, the primary main control board sends a waiting signal to all of the main control boards.

step 516, the primary main control board and the secondary main control boards concurrently wait for the next portions of the job distributed from the host.

Since a plurality of main control boards are asynchronous, there are differences in speed. This embodiment provides a synchronous scheme which ensures correct printing of jobs.

It can be seen from the above description that the foregoing embodiments of the present invention achieve the following technical effects:

(1) the system has a high bandwidth and a high utilization;
(2) the system possesses a strong extensibility;
(3) respective control sections are easy to be implemented and will not become complicated due to expansion of scale.

Obviously, the person skilled in the art should understand that respective modules and steps in the above-described embodiments may be implemented by a general-purpose computing device, and may be integrated in a single computing device, or distributed on a network formed by a plurality of computing devices. Alternatively, they may be implemented as program codes executable by a computing device so that they may be stored in a storage device so as to be executed by the computing device, or they can be respectively made into respective integrated circuit units, or some of the modules and steps may be made into a single integrated circuit module. Thus the present invention is not limited to any particular combination of hardware and software.

The foregoing description is only preferred embodiments of the present invention, and is not used to limit the present invention. For the person skilled in the art, various modifications and variations may be made to the present invention. Any modification, substitution, improvements and the like within the spirit and principle of the present invention should be included in the protection scope of the present invention.

What is claimed is:

1. A control method for use in digital printing, comprising:
    a host decomposing a job into a plurality of portions and distributing each portion of the job to one of main control boards;
    each of the main control boards concurrently converting the received portion of the job into pages and distributing the pages to a set of nozzle plates connected thereto;
    the nozzle plates converting the pages into printing data and driving a set of nozzles connected thereto to print the printing data.

2. The method according to claim 1, wherein the host decomposes the job into a plurality of portions according to ink colours.

3. The method according to claim 2, wherein the ink colours include four types of ink colours;
    the host decomposes the job into two portions, each of which includes the job of two ink colours;
    or the host decomposes the job into four portions, each of which includes the job of one ink colour.

4. The method according to claim 1, wherein one of the plurality of main control boards is a primary main control board, and the rest of the plurality of main control boards are secondary main control boards, wherein the primary main control board controls the secondary main control board to keep synchronized with the primary main control board.

5. The method according to claim 4, wherein each of the main control boards concurrently converting the received portion of the job into pages and distributing the pages to a set of nozzle plates connected thereto comprises:
    the primary main control board and the secondary main control boards concurrently converting the respective received portions of the job into the pages;
    the secondary main control boards sending requests to the primary main control board for distributing the pages to the sets of nozzle plates connected thereto;
    the primary main control board determining that all of the main control boards have converted the respective received portions of the job into the pages;
    the primary main control board sending a activating signal to all of the main control boards;
    the primary main control board and the secondary main control boards concurrently distributing the respective pages to the sets of nozzle plates connected thereto;
    the secondary main control boards receiving a signal indicating successful printing from all of the nozzle plates connected thereto;
    the secondary main control boards notifying the primary main control board that the printing is successful;
    the primary main control board determining that all of the main control boards have successfully printed;
    the primary main control board sending a waiting signal to all of the main control boards; and
    the primary main control board and the secondary main control boards concurrently waiting for the respective portions of the job distributed from the host.

* * * * *